United States Patent [19]
Wulforst

[11] Patent Number: 6,038,035
[45] Date of Patent: Mar. 14, 2000

[54] METHOD AND APPARATUS FOR SUBSTITUTE ORIGINAL DOCUMENTS

[76] Inventor: Howard E. Wulforst, 8209 Desert Beach Dr., Las Vegas, Nev. 89104

[21] Appl. No.: 08/195,341

[22] Filed: Feb. 8, 1994

[51] Int. Cl.[7] ....................................................... H04N 1/44
[52] U.S. Cl. ............................................ 358/406; 358/436
[58] Field of Search ........................... 358/400, 403–406, 358/434–439, 498; 380/18; H04N 1/00, 1/44

[56] References Cited

U.S. PATENT DOCUMENTS

| | | |
|---|---|---|
| 4,414,579 | 11/1983 | Dattilo et al. . |
| 4,958,235 | 9/1990 | Sims et al. ................................. 358/426 |
| 5,003,405 | 3/1991 | Wulforst . |
| 5,014,135 | 5/1991 | Ijuin et al. ................................ 358/498 |
| 5,280,369 | 1/1994 | Minamizawa ............................ 358/400 |
| 5,283,665 | 2/1994 | Ogata ....................................... 358/405 |
| 5,311,327 | 5/1994 | Fukushima et al. ..................... 358/444 |
| 5,321,520 | 6/1994 | Inga et al. ................................ 358/426 |
| 5,354,001 | 10/1994 | Hasegawa . |

*Primary Examiner*—Kim Yen Vu
*Attorney, Agent, or Firm*—Herbert C. Schulze

[57] ABSTRACT

A method and apparatus for transmitting a copy of an original document from a first location to a second location by means of transmitting an electronic image of said document and printing the same at the second location, verifying the accuracy of the transmitted image, validating the transmitted and printed copy and destroying the original document at the first location, and scanning, verifying, printing, comparing accuracy and validation of the transmitted copy.

5 Claims, 3 Drawing Sheets

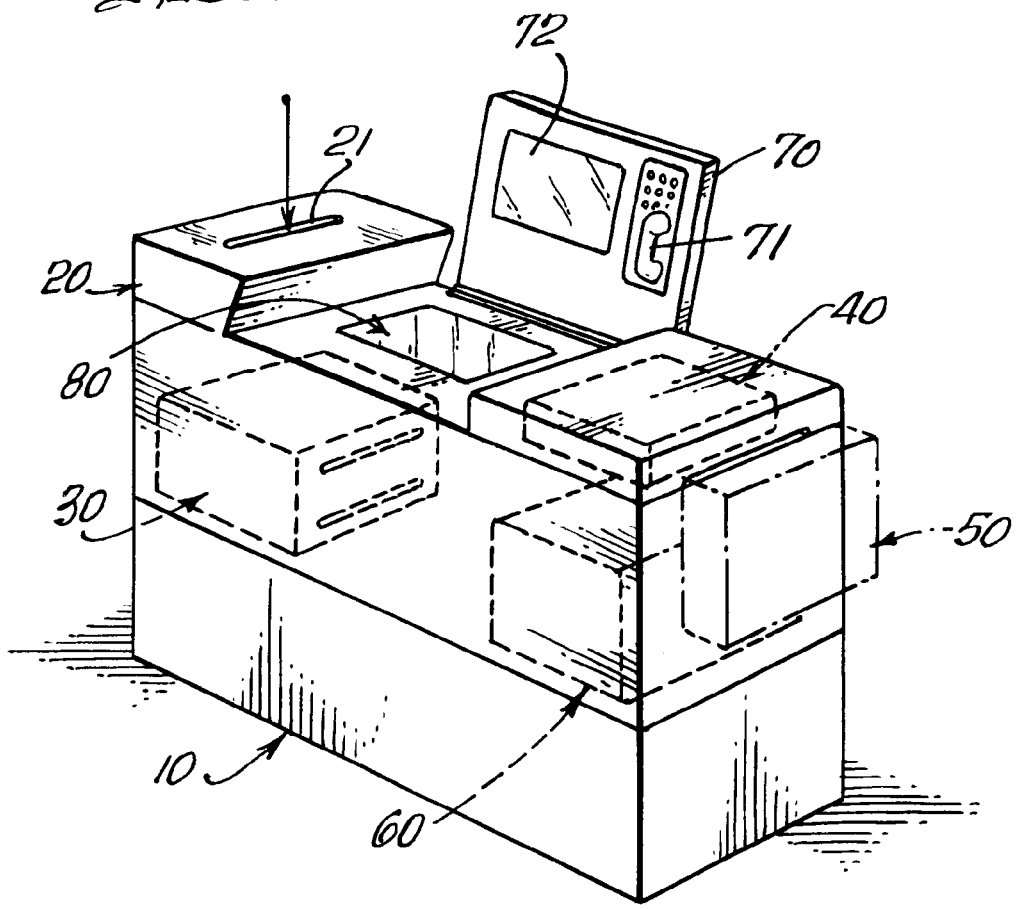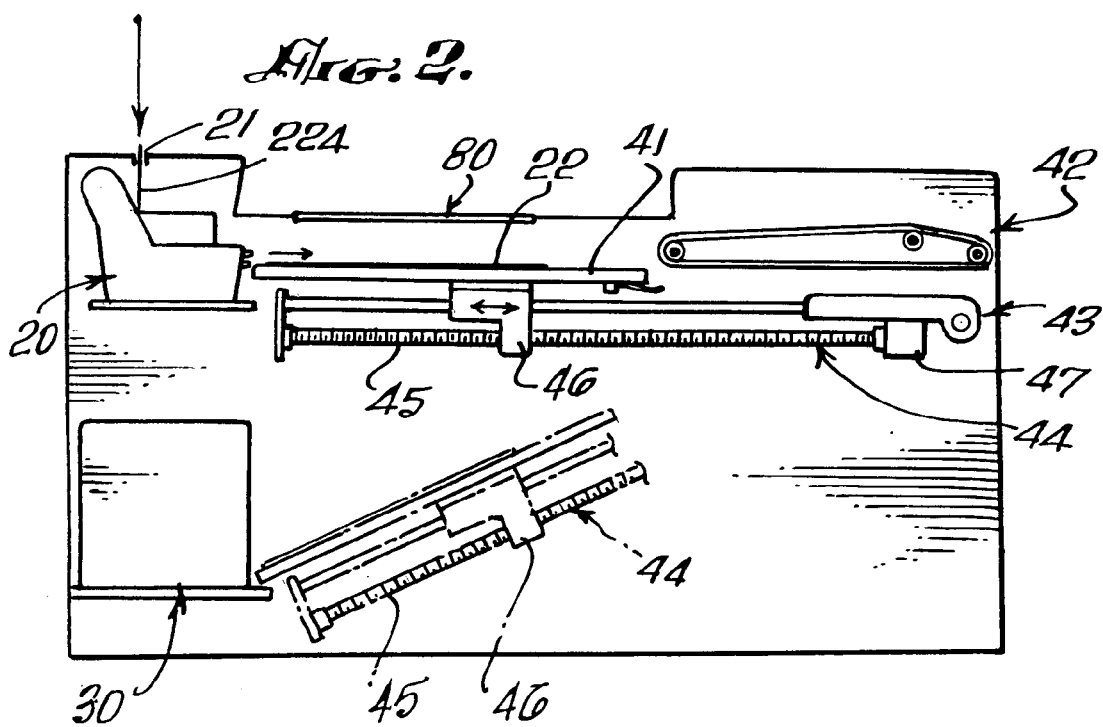

Fig. 3.
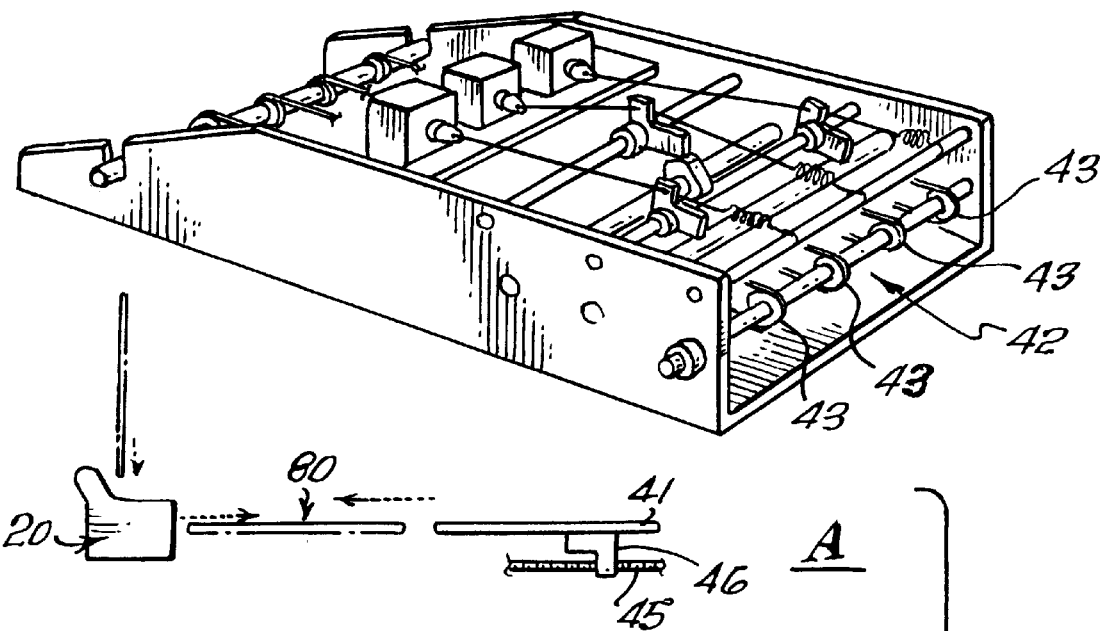
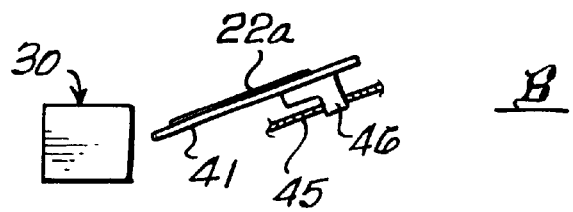
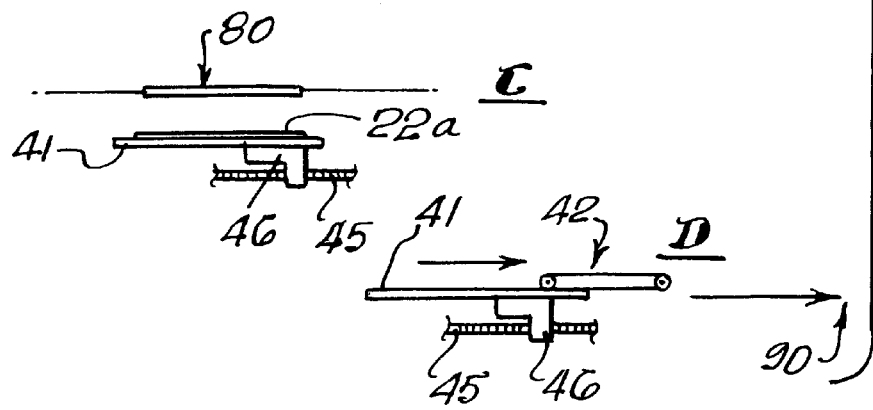
Fig. 4.

METHOD AND APPARATUS FOR SUBSTITUTE ORIGINAL DOCUMENTS

BACKGROUND OF THE INVENTION

I. Field of the Invention

This invention is in the general field of transmission of documents;

The invention is more particularly related to a unique method and apparatus to transmit and receive substitute documents according to the methods of my previously mentioned U.S. Pat. No. 5,003,405 and presently pending application Ser. No. 07/675,092, now abandoned.

The invention is also related to a unique method and apparatus for copying copyrighted material for use of a person at a location distant from where the copyrighted material exist, without having a duplicate copy or violation of the copyrighted material in existence.

II. Description of the Prior Art

The prior art is believed to be well expressed in my previously mentioned United States Patent and presently pending patent application. The present invention is an improvement over the prior art in providing an automated method and apparatus to achieve the desired results of my previously mentioned United States Patent and presently pending application.

BACKGROUND OF THE INVENTION

My previously mentioned United States Patent and presently pending patent application describe a unique method and apparatus for substituting a verified document for an original document. Such a method and apparatus has a wide field of use for rapid delivery of an authenticated document copy which can be substituted for an original document with the contemporaneous destruction of the original leaving the authenticated copy as the only "original" document.

The present invention provides an automated, efficient apparatus for accomplishing the method of my forementioned United States Patent and presently pending application. Additionally, the present invention provides a method and apparatus by which single copies of copyrighted material may be transmitted with a simultaneous destruction of the material being transmitted so that unauthorized use of the copyright material is avoided.

In the present invention I have provided a means for insertion of a document into an apparatus in which it is secure and observable. The apparatus scans the document and then electronically transmits an exact image of the document to a like apparatus at a different location. Verification of accuracy of transmission is by the printing of and authenticating of a copy from that image. When verified, the new document becomes the only original while the original which was scanned and transmitted is destroyed, thus leaving only one document which can be claimed to be the original.

It is an object of this invention to provide an efficient and reliable means for practicing the methods of my aforementioned patent and presently pending patent application;

Another object of this invention is to provide an automated and efficient apparatus and method for scanning a document, transporting such document for comparison of the electronic scanned and the original copy thereof with the transmission of the scanned image to another like apparatus which will perform essentially the same functions;

Another object of this invention is to provide a method and apparatus for scanning a document, viewing the document, transmitting what was scanned, receiving the transmission at another location, printing what was received, scanning and viewing what was printed, transmitting what was printed to the original location, receiving and comparing and authorizing the validation from the original location and then the validation of the copy and destruction of the original leaving only one original document;

Another object of this invention is to provide a means for transmittal of a copyrighted document in such manner that there will be only one copy of such copyrighted material in existence.

The foregoing objects and other objects and advantages of this invention will become apparent to those skilled in the art upon reading the description of a preferred embodiment which follows in conjunction with a review of the appended drawings.

BRIEF DESCRIPTION OF THE DRAWINGS

FIG. 1 is a schematic perspective of an apparatus suitable to practice the method of this invention and those of my previously referenced patent and co-pending application;

FIG. 2 is a side elevation of a transport path used in the apparatus of FIG. 1;

FIG. 3 is a schematic perspective of a transport mechanism to practice the method of this invention;

FIG. 4 is a schematic elevation of transport and viewing steps used in this method.

DESCRIPTION OF A PREFERRED EMBODIMENT

Figure 5:
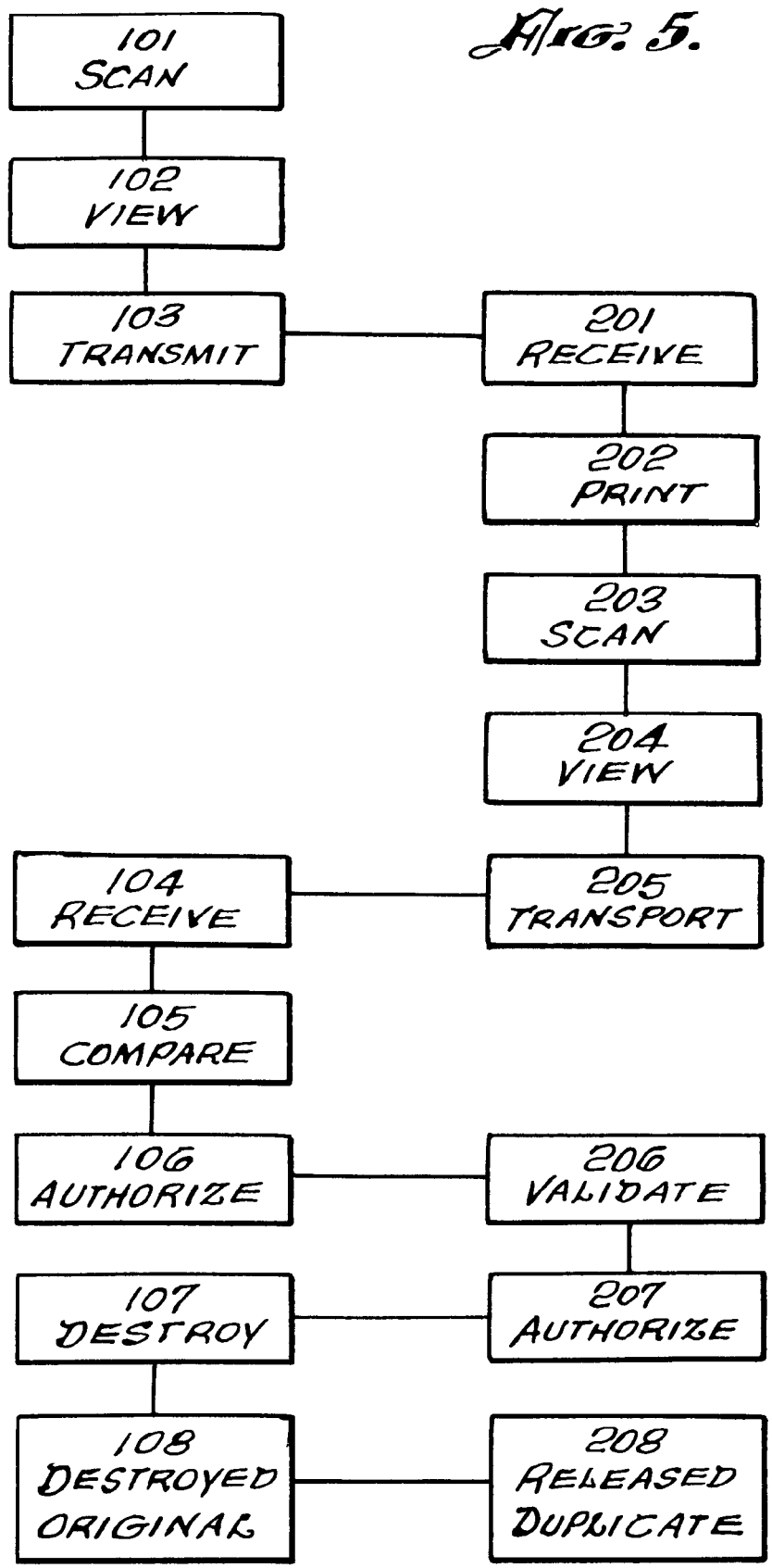
FIG. 5 is a block diagram showing the individual steps which are taken throughout this method in simplified form.

The figures are all basically schematic, since the mechanical and other physical details will be known to those skilled in the art and can be assembled and performed readily by those skilled in the art when this entire specification has been read and understood.

FIG. 1 illustrates a device capable of performing the operations necessary to perform the entire method of this invention.

FIG. 1 shows a basic cabinet structure 10 with the essential components being: a scanner 20 suitable to scan an entire document; a printer 30 suitable to print an entire document; a computer 60, preferably IBM compatible, but any suitable modern personal computer or the like will do; a document transport mechanism 40; a viewing window 80 so arranged that a document which has been scanned or printed may be transported by the transport mechanism so that it may be viewed; a computer monitor 70 is provided with its display screen 72 arranged for convenient viewing in cooperation with viewing window 80; a telephone or the like 71 for communication as might be necessary with another station; and a document security area 50 having document validation and/or destruction capability.

The components indicated above will be duplicated at another location, being any other location to which a document may be sent for duplication or from which a document may be sent for duplication.

FIG. 2 illustrates a document transport mechanism which may be favorably used. There will be a document transport platform 41 carried by a suitable bracket or the like 46 which will be movable by means of a revolving screw 45 or the like activated by a customary motor 47. The transport mechanism will be pivotally mounted by suitable arrangements known to those skilled in the art at 43 so that it can be in alignment as primarily shown in FIG. 2 in order to receive a document 22 from scanner 20 onto the transport platform. Document 22 will have been an original document which will have gone through the scanner 20 at access slot 21 or the like.

The scanner platform can be moved with the document in place so that it may be viewed through the viewing window 80. The transport mechanism may be also be dropped to the position shown in phantom at 44 so that it may pick up a printed document from the printer. Having once picked up a printed document it will be elevated back to the original horizontal position where the document can be viewed and can also otherwise be transported.

FIG. 3 illustrates a document removing mechanism which consists of a series of belts or the like 43 on a suitable mechanism, the details of which have not been described since they will be well understood by those skilled in the art. By appropriate motion being imparted to the belts 43 a document can be moved from the document transport platform and may be carried into the document security area 50.

The details and operation of the security area 50 will be that when used as the original document transmitting apparatus the document placed in that security area will be locked in place and will remain safe until such time as authorization for destruction is received as will be described below. When authorization for destruction is received it may be destroyed by burning, by shredding, or otherwise, as will be known to those skilled in the art.

When used as the duplicate document receiving apparatus, the newly printed and duplicate document will be placed within the security area 50 and will remain there until such time as it has been authenticated, at which time it will be released for use.

FIG. 4 is another showing of the elements of FIG. 2 in reduced scale and is for the purpose of showing the document path through the scanner past the viewing station off of the transport platform, and also to show the copy pick up position for a copy from the printer. FIG. 4 also shows the final exit at 90 of the document which will be passing into the security area 50.

FIG. 5 can be used to trace each individual operation which may be desired for the complete operation. In this operation there will be two of the basic mechanisms as outlined in the preceding figures. One of the mechanisms will be the transmitting device and the other will be the receiving device. The two devices will be substantially identical.

For convenience in tracing the operations, using FIG. 5, the transmitting apparatus operations are all in the 100 series while the receiving apparatus operations are all in the 200 series. The first operation at 101 is to scan an original document which will then be in electronic computer storage in the computer 60. It may be viewed on the monitor screen 72 and if desired transported by the transporting mechanism under the viewing window 80 so that the actual document and the computer retained document may be compared. This will be done at 102. When the document has been scanned and is in the computer it may then be transmitted at 103 by modem or the like to the receiving computer at 201. After having been received within the computer at 201, it may be printed at 202 by that unit's printer.

After being printed the document will be picked up by the transport mechanism from the printer and may be scanned if desired for comparison on the monitor at 203 and may also be viewed and compared at 204 if desired. This document as printed and scanned will be then transmitted at 205 to the initial sending mechanism at 104 where it will be received. When it is received within the computer at that location it can be compared by the computer to the actual document which was transmitted. Upon such comparison, if found to be accurate, the originating mechanism will authorize the validation at 106 of the copy at the receiving machine at step 206. After the validation has been completed, the receiving station at 207 will send an authorization to the originating station as at 107 authorizing the destruction of the original document. At this time, the two security areas 50 will be opened and the old original document will be destroyed at 108 and simultaneously the new duplicate original will be released at 208.

When used for purposes of assuring a non-duplication of copyrighted information, it will be clear that the copyrighted document will be the document which is otherwise the original document referred to throughout the specification. Once is has been transmitted, printed and verified, on the simultaneous release of the new original and destruction of the previous original there has been no duplication of copyright and thus no unauthorized possible uses.

While the embodiments of this invention shown and described are fully capable of achieving the objects and advantages desired, it is to be understood that such embodiments have been shown and described for purposes of illustration only and not for purposes of limitation.

I claim:

1. The method of providing a legally usable and authenticated document in lieu of an original document comprising:

a. scanning an original document by a computer scanner at a first location;

b. verifying the accuracy of the scanned information;

c. transmitting the scanned information by first computer means at the first location to second computer means at a second location;

d. printing the information thus transmitted at said second location;

e. scanning the printed document at the second location;

f. verifying the accuracy of the printed document at the second location;

g. transmitting the verified printed information by said second computer means from the second location to said first computer means at the first location;

h. receiving the verified printed information from the second location at the first location;

i. comparing the verified printed information from the second location to the original information as scanned at the first location;

j. transmitting an authorization from the first location to the second location to validate the verified printed information at the second location;

k. validating said verified printed information at said second location;

l. verifying the accuracy of the validated verified printed information at the second location;

m. transmitting authorization from the second to the first location for destruction of the original scanned information;

n. destroying said original document at said first location.

2. The method of claim 1 wherein after scanning said original document at said first location said original document is maintained in a secure environment until authorization is received from the second location to destroy said original document.

3. The method of claim 1 wherein said document at said second location is maintained in a secure environment until destruction of said original document at the first location has been authorized.

4. The method of claim 2 wherein the validated verified printed information at the second location is maintained in a secure environment until destruction of the original document at the first location has been authorized.

5. The method of providing a properly usable copyrighted document for use by a single user at a location remote from the location of the original copyrighted material comprising: scanning the original copyrighted material by a computer scanner at a first location; verifying the accuracy of the scanned information at said first location; transmitting the scanned, copyrighted information by first computer means at the first location to second computer means at a second location; printing the copyrighted information so transmitted at said second location; scanning the printed copyrighted document at the second location; verifying the accuracy of the printed copyrighted document at the second location; and, after verifying accuracy of the printed document at the second location, simultaneously releasing said document for use while destroying the original copyrighted document at said first location.

\* \* \* \* \*